(12) United States Patent
Iwatsu et al.

(10) Patent No.: US 9,847,168 B2
(45) Date of Patent: Dec. 19, 2017

(54) METHOD FOR MANUFACTURING STEEL SHEET FOR ROTOR CORE FOR IPM MOTOR

(71) Applicant: NISSHIN STEEL CO., LTD., Tokyo (JP)

(72) Inventors: Tomonaga Iwatsu, Hiroshima (JP); Yukio Katagiri, Hiroshima (JP); Susumu Fujiwara, Hiroshima (JP); Akito Kawamoto, Hiroshima (JP)

(73) Assignee: Nisshin Steel Co., Ltd., Tokyo (JP)

( * ) Notice: Subject to any disclaimer, the term of this patent is extended or adjusted under 35 U.S.C. 154(b) by 203 days.

(21) Appl. No.: 14/389,595

(22) PCT Filed: Mar. 27, 2013

(86) PCT No.: PCT/JP2013/059009
§ 371 (c)(1),
(2) Date: Sep. 30, 2014

(87) PCT Pub. No.: WO2013/146886
PCT Pub. Date: Oct. 3, 2013

(65) Prior Publication Data
US 2015/0047746 A1 Feb. 19, 2015

(30) Foreign Application Priority Data

Mar. 30, 2012 (JP) .................. 2012-081369
Oct. 26, 2012 (JP) .................. 2012-236809

(51) Int. Cl.
*C21D 8/02* (2006.01)
*H01F 41/02* (2006.01)
(Continued)

(52) U.S. Cl.
CPC ........... *H01F 41/024* (2013.01); *C21D 6/001* (2013.01); *C21D 6/002* (2013.01); *C21D 6/005* (2013.01);
(Continued)

(58) Field of Classification Search
CPC ....................................... C21D 8/02
(Continued)

(56) References Cited

FOREIGN PATENT DOCUMENTS

| CN | 101454465 A | 6/2009 |
| EP | 2693602 A1 | 2/2014 |

(Continued)

OTHER PUBLICATIONS

English language machine translation of JP2009046738 to Fujiwara et al. Generated Aug. 22, 2016.*

(Continued)

*Primary Examiner* — Brian Walck
(74) *Attorney, Agent, or Firm* — Rothwell, Figg, Ernst & Manbeck, P.C.

(57) ABSTRACT

The present invention manufactures a steel sheet for a rotor core for an IPM motor, wherein the steel sheet has a magnetic flux density $B_{8000}$ of 1.65 T or more as measured when magnetic field strength is 8000 A/m, and a residual magnetic flux density Br of 0.5 T or more as measured at that time, and optionally, a coercivity Hc of 100 A/m or more as measured after magnetization reaches 8000 A/m. By using the steel sheet manufactured according to the present invention for a rotor core of an IPM motor, it is possible to increase further an output torque in a high-speed rotational range and raise further the maximum rotational speed.

9 Claims, 2 Drawing Sheets

(51) Int. Cl.
| | |
|---|---|
| C21D 8/12 | (2006.01) |
| C22C 38/00 | (2006.01) |
| C22C 38/06 | (2006.01) |
| H01F 1/16 | (2006.01) |
| C22C 38/02 | (2006.01) |
| C22C 38/04 | (2006.01) |
| C22C 38/08 | (2006.01) |
| C22C 38/12 | (2006.01) |
| C22C 38/14 | (2006.01) |
| C22C 38/16 | (2006.01) |
| C22C 38/18 | (2006.01) |
| C21D 6/00 | (2006.01) |
| C22C 38/20 | (2006.01) |
| C22C 38/26 | (2006.01) |
| C22C 38/28 | (2006.01) |
| C22C 38/32 | (2006.01) |
| H02K 15/00 | (2006.01) |
| C21D 9/573 | (2006.01) |
| C21D 9/46 | (2006.01) |

(52) U.S. Cl.
CPC ............. *C21D 6/008* (2013.01); *C21D 8/02* (2013.01); *C21D 8/12* (2013.01); *C21D 8/125* (2013.01); *C21D 8/1244* (2013.01); *C21D 8/1283* (2013.01); *C21D 9/573* (2013.01); *C22C 38/00* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/26* (2013.01); *C22C 38/28* (2013.01); *C22C 38/32* (2013.01); *H01F 1/16* (2013.01); *H02K 15/00* (2013.01); *C21D 8/1233* (2013.01); *C21D 9/46* (2013.01); *C21D 2211/002* (2013.01); *C21D 2211/008* (2013.01)

(58) Field of Classification Search
USPC .................................. 148/111–113, 650–652
See application file for complete search history.

(56) References Cited

FOREIGN PATENT DOCUMENTS

| | | |
|---|---|---|
| JP | 2000-278900 A | 10/2000 |
| JP | 2005-60811 A | 3/2005 |
| JP | 2005-113184 A | 4/2005 |
| JP | 2005-133175 A | 5/2005 |
| JP | 2009-46738 A | 3/2009 |

OTHER PUBLICATIONS

English language machine translation of JP2005113184 to Fujiwara et al. Generated Aug. 22, 2016.*
"Straightening of Bars, Shapes, and Long Parts," Metalworking: Sheet Forming, vol. 14B, ASM Handbook, ASM International, 2006, p. 472-482.*
European Rule 62 EPC Communication issued in European Patent Application No. 13768070.8, 6 pages (dated Nov. 20, 2015).

* cited by examiner

METHOD FOR MANUFACTURING STEEL SHEET FOR ROTOR CORE FOR IPM MOTOR

CROSS REFERENCE TO RELATED APPLICATIONS

This application is a 35 U.S.C. §371 National Phase Entry Application from PCT/JP2013/059009, filed Mar. 27, 2013, and designating the United States, which claims priority under 35 U.S.C. §119 to Japanese Patent Application No. 2012-081369 filed on Mar. 30, 2012, and to Japanese Patent Application No. 2012-236809 filed on Oct. 26, 2012, which are incorporated herein by reference in their entireties.

TECHNICAL FIELD

The present invention relates to a method for manufacturing a steel sheet for a rotor core for an interior permanent magnet motor (hereafter "IPM motor") that is used mainly for electric vehicles, hybrid vehicles and machine tools.

BACKGROUND ART

Generally, IPM motors, which use expensive permanent magnets, are expensive, but are more efficient than induction motors. For this reason, IPM motors are widely used, for example, for driving motors and power generating motors for hybrid vehicles and electric vehicles, and also motors for home electric appliances, various machine tools and industrial machines.

An iron core of an IPM motor is composed of a stator and a rotor. Since an AC magnetic field is directly applied to the iron core on the stator side through windings, the iron core on the stator side must have high magnetic permeability and also high volume resistivity so as to reduce iron loss. Therefore, electromagnetic steel sheets with soft magnetic characteristics improved by the addition of Si to ultra-low-carbon steel are used for the iron core on the stator side (see, for example, Patent Documents 1 and 2).

On the other hand, since a permanent magnet is embedded in the iron core on the rotor side, this iron core mainly acts as a yoke to increase magnetic flux density. The iron core on the rotor side is slightly affected by the AC magnetic field generated from the stator side, but this influence is limited. Therefore from the standpoint of characteristics, it is not necessary to use electromagnetic steel sheets, which are advantageous for the iron loss characteristic, for the iron core on the rotor side. However, the same electromagnetic steel sheets as used for the stator side are also usually used for the iron core on the rotor side because the product yield of the electromagnetic steel sheets decreases and the production costs of the motor increase when the electromagnetic steel sheets are used only for the stator.

When an IPM motor is to be installed in a vehicle, the IPM motor needs to be reduced in size because of the need to reduce the size and weight of the vehicle. In this case, the rotational speed of the rotor is increased in order to obtain a motor output (torque) equal to or greater than that of a conventional motor despite the reduction in size. The efficiency of a motor generally improves as the rotational speed of the rotor increases. However, in an IPM motor, an induced electromotive force is generated on the stator windings by the rotation of the embedded permanent magnets. This induced electromotive force increases with the increase in the rotational speed. Where the electromotive force exceeds the input voltage, the motor can no longer rotate. Therefore, in an IPM motor, field-weakening control, which generates a magnetic flux from the stator side in a direction to cancel the magnetic flux of the permanent magnets and suppresses the induced electromotive force, is performed when the motor is operated in a high-speed rotational range, as indicated, for example, in Patent Document 3. The field-weakening control enables the operation in a high-speed rotational range, but decreases the motor torque because power is used for cancelling the magnetic flux of the permanent magnets. Patent Document 3 indicates that the amount of electricity to be used for the field-weakening control is decreased by improving the shape of the magnets.

Meanwhile, even if the IPM motor is reduced in size, there is a problem that where rotational speed of the rotor is increased so as to obtain a torque equal to or higher than that in a conventional motor, the centrifugal forces that act upon the permanent magnets embedded in the rotor increase thereby damaging the rotor. To prevent this damage, it is preferred that a material with a high yield strength be used for the rotor. For example, a non-orientated electromagnetic steel sheet (35A300) containing about 3% Si has a yield strength after magnetic annealing of approximately 400 N/mm$^2$. Therefore in the case of a comparatively large IPM motor with a rotor diameter of 80 mm or more, the limit of the rotational speed at which damage is not caused is about 20,000 rpm, although the specific value somewhat differs depending on the structure of the rotor. A variety of research has been conducted to increase the yield strength of iron cores based on electromagnetic steel sheets, but still the yield strength is at most about 780 N/mm$^2$. As a method for suppressing damage to a rotor core caused by high-speed rotation, for example, Patent Document 4 suggests using steel sheet with high strength and high saturation magnetic flux density, rather than electromagnetic steel sheet, as a material for the rotor core.

Patent Document 1: Japanese Patent Application laid-open No. 2005-133175

Patent Document 2: Japanese Patent Application laid-open No. 2005-60811

Patent Document 3: Japanese Patent Application laid-open No. 2000-278900

Patent Document 4: Japanese Patent Application laid-open No. 2009-46738

SUMMARY OF INVENTION

Technical Problem

In Patent Document 3, the amount of electricity used for the field-weakening control is reduced by improving the shape of the magnets, but adjusting the residual magnetic flux density and coercivity of the base steel sheets is not considered. In Patent Document 4, the increase in strength makes it possible to increase the rotational speed, but the residual magnetic flux density and coercivity are not mentioned and the possibility of increasing the torque during the field-weakening control is unclear.

Therefore, the present invention has been made to solve the above-mentioned problems, and an object of the present invention is to provide a method for manufacturing a steel sheet that makes it possible to further increase the output torque in a high-speed rotational range and further increase the maximum rotational speed when using the steel sheet for a rotor core for an IPM motor.

Solution to the Problem

The inventors of the present invention have produced test IPM motors by using various steel sheets and performed performance evaluations of the motors in order to solve the above-mentioned problems. The results obtained have demonstrated that adjusting the magnetic flux density and residual magnetic flux density of the base steel sheet having a specific composition is an effective method, and adjusting the magnetic flux density, residual magnetic flux density, and coercivity is an even more effective method for reducing the leaking magnetic flux from the permanent magnets, increasing the magnetic flux which is effective for the magnet torque, and also obtaining a large output torque in a high-speed rotational range in which the field-weakening control is performed.

Thus, the present invention provides a method for manufacturing a steel sheet for a rotor core for an IPM motor, which has a magnetic flux density $B_{8000}$ of 1.65 T or more as measured when a magnetic field strength is 8000 A/m, a residual magnetic flux density Br of 0.5 T or more as measured at that time, and optionally a coercivity Hc of 100 A/m or more as measured after a magnetization reaches 8000 A/m, wherein a hot-rolled steel sheet having a composition consisting of C: more than 0.0005% by mass to 0.90% by mass, Si: 0% by mass to 3.0% by mass, Mn: 0% by mass to 2.5% by mass, P: 0.05% by mass or less, S: 0.02% by mass or less, acid-soluble Al: 0.005% by mass to 3.0% by mass, and Si+Al: 5.0% by mass or less, with a balance of Fe and inevitable impurities, is cold rolled, heated to 800° C. or more in a continuous annealing line or continuous quenching line, then cooled down to 450° C. or less at a cooling speed of 10° C./sec or more and held at a temperature of 200° C. to 450° C. for 20 seconds or more.

Advantageous Effects of the Invention

When the steel sheet of the present invention is used for a rotor core for an IPM motor, it is possible to reduce the leaking magnetic flux from the permanent magnets, increase the magnetic flux which is effective for the magnet torque, and also further increase the output torque in a high-speed rotational range, and further increase the maximum rotational speed of the steel sheet.

DESCRIPTION OF EMBODIMENTS

The steel sheet for a rotor core for an IPM motor obtained in accordance with the manufacturing method of the present invention is characterized by a magnetic flux density $B_{8000}$ of 1.65 T or more as measured when a magnetic field strength is 8000 A/m and a residual magnetic flux density Br of 0.5 T or more as measured at that time, and optionally a coercivity Hc of 100 A/m or more as measured after a magnetization reaches 8000 A/m.

The reasons for placing limitations on the magnetic characteristics are explained hereinbelow.

<Magnetic Flux Density $B_{8000}$ as Measured when a Magnetic Field Strength is 8000 A/m: 1.65 T or More>

Figure 1:
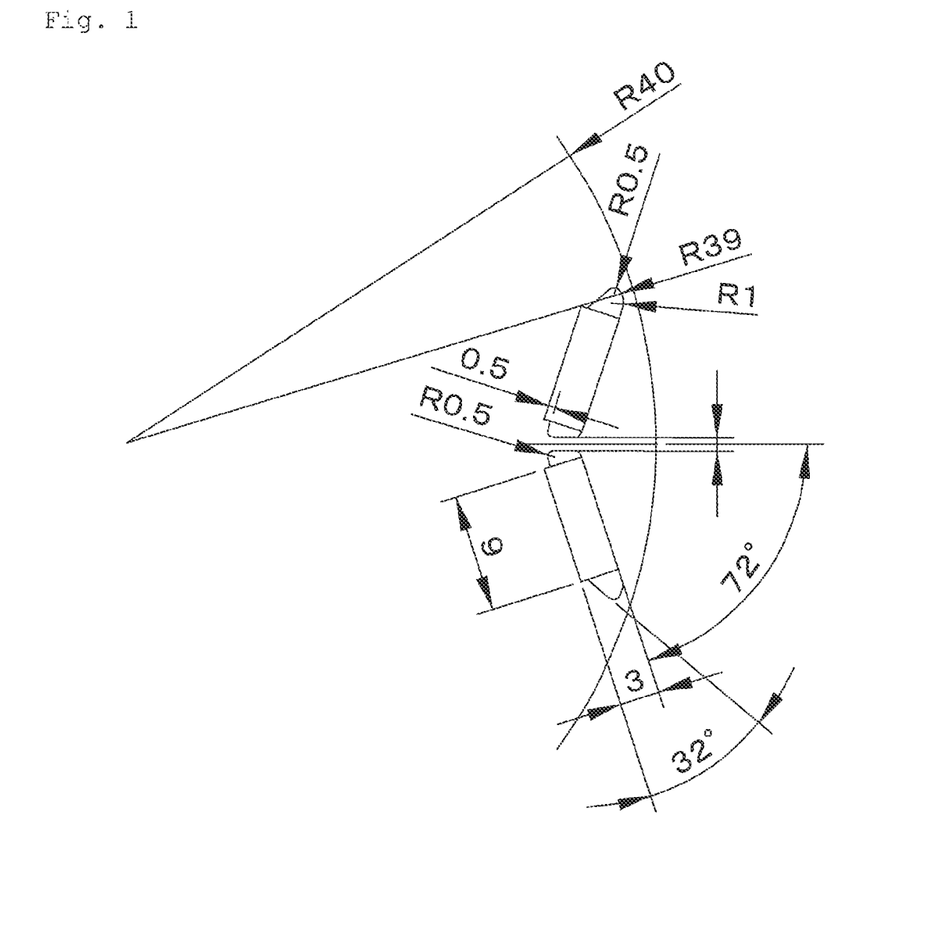
FIG. 1 is a partial enlarged drawing of a rotor fabricated in an example.

The magnetic flux density $B_{8000}$ is set to 1.65 T or more in order to effectively use the reluctance torque based on the difference in the inductance value between a position (d axis) at which a permanent magnet 12 is inserted and a position (q axis) at which the magnet is not inserted when the rotor rotates at a high speed, and to demonstrate the torque performance equal to or better than that of the conventional steel sheets, in particular, in a high-speed rotational range.

<Residual Magnetic Flux Density Br as Measured after a Magnetization Reaches 8000 A/m: 0.5 T or More>

The effect of setting the residual magnetic flux density Br as measured at the time of magnetization to 8000 A/m to 0.5 T or more is described below. Thus, in an IPM motor, a magnetic flux (q-axis magnetic flux) passing through the inside of the rotor is made to flow from the stator side in order to obtain a reluctance torque, in addition to the magnet magnetic flux (d-axis magnetic flux) created by the permanent magnets, the torque is increased, and efficiency is also increased. However, it is well known, as indicated, for example, in "Heisei 23 Nendo Denki Gakkai Sangyo Oyo Bumon Daikai Koen Rombunshu (2011 IEEE-Japan Industry Applications Society Conference, National Convention Record), 3-24 (2011), PIII-179", that where the input current of the motor is increased and the q-axis magnetic flux is increased, the orientation of the d-axis magnetic flux is shifted and deflected in the direction opposite to the rotational direction due to interference with the d-axis magnetic flux, and the maximum torque is reduced through the change of d-axis and q-axis inductance. This phenomenon is called dq-axes interference and is caused by strengthening of the magnetic flux forward in the rotational direction and weakening of the magnetic flux rearward in the rotational direction with respect to the original d-axis magnetic flux. In a material with high magnetic permeability, in which coercivity is small and residual magnetic flux density is also small, as in an electromagnetic steel sheet, the weakening of the magnetic flux rearward in the rotational direction proceeds smoothly, whereas in a material with low magnetic permeability, which has large coercivity, the weakening of the magnetic flux is suppressed due to large residual magnetic flux density, thereby reducing the deflection caused by the aforementioned shift of the d-axis magnetic flux. As a result, it is possible to suppress the decrease in the maximum torque associated with the dq-axes interference. In order to obtain such a result, it is necessary to make the residual magnetic flux density Br of 0.5 T or more, preferably 1.0 T or more, as measured at the time of magnetization to 8000 A/m. The inventors of the present invention have fabricated test IPM motors by using various steel sheets and evaluated the performance of the motors. The results obtained demonstrate that where a rotor core is formed using a steel sheet with a residual magnetic flux density Br of 0.5 T or more, desirably 1.0 T or more, power consumption of the field-weakening control performed during high-speed rotation can be reduced and the output torque can be increased.

<Coercivity Hc as Measured after a Magnetization Reaches 8000 A/m: 100 A/m or More>

When high torque is needed in a high-speed rotational range, it is preferred that the steel sheet in accordance with the present invention have a coercivity of 100 A/m or more. The reason therefore is explained below. Thus, since the magnetic permeability decreases as the coercivity increases, the leaking magnetic flux from the permanent magnet in a bridge portion decreases. As a result, the magnetic flux from the permanent magnet can be effectively used. In order to obtain such an effect, the coercivity Hc at the time of magnetization to 8000 A/m should be preferably 100 A/m or more, more preferably 300 A/m or more, and most preferably 1000 A/m or more. The effectiveness of this effect increases in a structure in which the leaking magnetic flux from the permanent magnet is large, for example, when the permanent magnet is split in two and a center bridge is provided in order to increase resistance to centrifugal forces acting during high-speed rotation, although the results vary depending on the rotor structure.

Although no mechanical strength is necessarily required for the steel sheet in accordance with the present invention, when the steel sheet is used for an IPM motor for which high-speed rotation is needed, it is preferred that the steel sheet have a yield strength of 780 N/mm$^2$ or more. Where the yield strength is within this range, the rotor core can withstand the centrifugal forces acting upon the permanent magnet during high-speed rotation and the rotor is not damaged even in high-speed rotational range. Furthermore, since the steel sheet in accordance with the present invention excels in field-weakening controllability, the decrease in torque can be suppressed even in a high-speed rotational range. Therefore, a high-performance motor in which high-speed rotation and a high torque are obtained can be provided. Therefore, the motor can be used for various applications, such as automobiles and home electric appliances. Further, by imparting sufficient strength to the steel sheet, it is possible to reduce the width of the bridge provided in the permanent magnet insertion holes of the rotor, thereby making it possible to further reduce the leaking magnetic flux. Where the leaking magnetic flux can be decreased without damaging the rotor even when the bridge width is reduced due to the increased strength of the rotor core, the degree of freedom in designing the rotor is increased. Furthermore, since the permanent magnet can be reduced in size due to the reduction in the leaking magnetic flux, the motor can be greatly reduced in terms of cost. The output torque can also be increased without reducing the permanent magnet in size. The bridge width may also be designed in consideration of both the increase in torque, which results from the possible high-speed rotation, and the reduction of the permanent magnets in size. The upper limit of the yield strength of the steel sheet in accordance with the present invention is 2000 N/mm$^2$. This is because the magnetic flux density $B_{8000}$ of 1.65 T or more cannot be obtained at a magnetic field strength of 8000 A/m in a material with a yield strength above 2000 N/mm$^2$.

The yield strength in the present invention is measured by a tensile test method stipulated by JIS Z 2241 by using a JIS No. 5 tensile test piece.

It is also preferred that the steel sheet in accordance with the present invention have a flatness equal to or less than 0.1%, the flatness being defined by a steepness per sheet width. Since a rotor for an IPM motor is manufactured by laminating steel sheets punched to a rotor shape, a good space factor during the lamination is preferred. In order to obtain a good space factor, it is preferred that the flatness defined by the steepness per sheet width be equal to or less than 0.1%. The flatness in the present invention is obtained by representing (in percentage) maximum height (height obtained by subtracting the sheet thickness) per unit length in the width direction in a state in which a steel sheet with a length of 1 m or more is placed on a fixed table.

The steel sheet in accordance with the present invention preferably has a composition consisting of C: more than 0.0005% by mass to 0.90% by mass, Si: 0% by mass to 3.0% by mass, Mn: 0% by mass to 2.5% by mass, P: 0.05% by mass or less, S: 0.02% by mass or less, acid-soluble Al: 0.005% by mass to 3.0% by mass, and Si+Al: 5.0% by mass or less, with a balance of Fe and inevitable impurities. The components of the steel material may include one or more components selected from the group consisting of Ti, Nb, and V at 0.01% by mass to 0.20% by mass in total, one or more components selected from the group consisting of Mo: 0.1% by mass to 0.6% by mass, Cr: 0.1% by mass to 1.0% by mass and B: 0.0005% by mass to 0.005% by mass, and one or more components selected from the group consisting of Cu: 0.05% by mass to 1.5% by mass and Ni: 0.05% by mass to 1.0% by mass.

The reasons for restricting the composition of the steel material are explained below.

<C: More than 0.0005% by Mass to 0.90% by Mass>

C is an element that precipitates as a solid solution or cementite (Fe$_3$C) in steel and effectively increases the steel strength. The content of C in excess of 0.0005% by mass is preferred for obtaining a yield strength suitable for use in a rotor core for an IPM motor. However, where the content is above 0.90% by mass, the magnetic flux density tends to decrease. In particular, it is needed that the content of C be equal to or higher than 0.05% by mass in order to obtain a yield strength of 780 N/mm$^2$ or more.

<Si: 0% by Mass to 3.0% by Mass>

Si is an element effective in increasing the steel strength and also effective in increasing volume resistivity and reducing eddy current loss, but in the present invention, the addition thereof is optional. In order to obtain the effect of suppressing eddy current loss and increasing strength, it is preferred that the content of silicon be equal to or higher than 0.01% by mass. However, where the content is higher than 3.0% by mass, the toughness of the steel sheet is degraded, and in addition, the magnetic flux can be reduced.

<Mn: 0% by Mass to 2.5% by Mass>

Mn is an element effective in increasing the steel strength, but in the present invention, the addition thereof is optional. In order to obtain the effect of increasing strength, it is preferred that the content of manganese be equal to or higher than 0.05% by mass. However, where the content exceeds 2.5% by mass, the strength increasing effect is saturated and the magnetic flux density can be decreased.

<P: 0.05% by Mass or Less>

P is an element effective in increasing the steel strength, but it greatly decreases the steel toughness. Since the content up to 0.05% by mass is allowed, the upper limit is set to 0.05% by mass.

<S: 0.02% by Mass or Less>

S is an element causing high-temperature embrittlement, and when contained in a large amount, it causes surface defects during hot rolling and degrades the surface quality. Therefore, it is preferred that the content thereof be as low as possible. Since a content up to 0.02% by mass is allowed, the upper limit is set to 0.02% by mass.

<Soluble Al: 0.005% by Mass to 3.0% by Mass, and Si+Al: 5.0% by Mass or Less>

Al is an element that is added as a deoxidizing agent and it is also effective, similarly to Si, in increasing the volume resistivity of steel. For this effect to be demonstrated, it is needed that acid-soluble Al be contained at 0.005% by mass or more. However where the total content thereof and Si exceeds 5.0% by mass, the decrease in magnetic flux density increases and the performance of the motor is degraded.

<One or More from Ti, Nb, and V: 0.01% by Mass to 0.20% by Mass>

Ti, Nb and V are elements that form carbonitrides in steel and are effective in increasing the steel strength by precipitation hardening. In order to obtain this effect, it is preferred that one, or two or more thereof be added at 0.01% by mass or more. However, where those elements are added in an amount above 0.20% by mass, the increase in strength is saturated by the coarsening of precipitates and the production costs can be increased.

<One or More from Mo: 0.1% by Mass to 0.6% by Mass, Cr: 0.1% by Mass to 1.0% by Mass and B: 0.0005% by Mass to 0.005% by Mass>

Mo, Cr, and B are elements increasing the quenching ability of steel and are effective in increasing the steel strength. In order to obtain such effects, it is preferred that one or more of Mo, Cr, and B be added in an amount equal to or higher than a lower limit value that has been set therefor. However, where those elements are added in excess of the upper limit values that have been set for each of them the effects reach saturation and the production costs increase. The effects are demonstrated when only one element is added and when two or more of the elements are added, but when two or more of the elements are added, where the amount added exceeds ½ of the upper limit value that has been set for each of them, the increase in production costs becomes large in comparison to the effects obtained. Therefore, it is preferred that the amount added be equal to or less than ½.

<One or More Cu: 0.05% by Mass to 1.5% by Mass and Ni: 0.05% by Mass to 1.0% by Mass>

Cu and Ni increase the quenching ability of steel and are effective in increasing the steel strength. They are also elements effective in raising the saturation magnetic flux density. In order to obtain those effects, it is preferred that the elements be added in an amount equal to or higher than the lower limit value that has been set therefor. However, where those elements are added in excess of the upper limit values that have been set for each of them, the effects reach saturation and the production costs increase.

The method for manufacturing a steel sheet for a rotor core for an IPM motor in accordance with the present invention will be explained below. In the method for manufacturing a steel sheet for a rotor core for an IPM motor in accordance with the present invention, a hot-rolled steel sheet having the above-described composition is cold rolled, heated to 800° C. or more in a continuous quenching line, then cooled to 450° C. or less at a cooling speed of 10° C./s or more and held at a temperature of 200° C. to 450° C. for 20 seconds or more.

<Hot Rolling and Cold Rolling Conditions>

Hot rolling and cold rolling conditions need not be particularly specified, and hot rolling may be implemented by the usual method, but it is preferred that the finish temperature of hot rolling be in an a single-phase region or γ single-phase region. Further, where the coiling temperature is too high, oxide scale becomes thick, thereby impeding subsequent pickling. Therefore, it is preferred that the coiling temperature be equal to or lower than 700° C.

<Annealing Temperature>

When increasing the strength by a continuous heat treatment, since the heating temperature of less than 800° C. does not provide a change into an austenite sufficiently, sufficient yield strength cannot be obtained. Therefore, there is a need to heat to a temperature of 800° C. or more.

<Cooling Conditions: Cooling Down to 450° C. or Less at an Average Cooling Speed of 10° C./Sec and Holding at 200° C. to 450° C. for 20 Seconds or More>

In a case where a cooling speed is less than 10° C./sec or a case where a cooling finishing temperature is more than 450° C., since the volume fraction of the hard phase decreases, sufficient yield strength cannot be obtained. Further, in a case where a holding temperature after the cooling is less than 200° C. or a case where a holding time is less than 20 seconds, the toughness is not sufficiently recovered by the tempering and the effects of the press tempering treatment or the tension annealing treatment cannot be obtained sufficiently. Meanwhile, where the holding temperature after the cooling is above 450° C., since a softening occurs, sufficient yield strength cannot be obtained.

<Press Tempering Treatment>

By performing the press tempering treatment of the as-quenched steel sheet at a tempering temperature range, it is possible to recover the toughness by the tempering as well as to recover the quenching strain and the residual stresses, and it is possible to obtain a flatness of the steel sheet of 0.1% or less. Where the heating temperature is below 200° C., good flatness cannot be obtained. Meanwhile, where the heating temperature is above 450° C., the softening occurs as mentioned above and sufficient yield strength cannot be obtained. The pressure in press tempering need not be particularly high, provided that the flat shape of the steel sheet is maintained. For example, in the case of a thin steel sheet with a thickness equal to or less than 1.0 mm, a low pressure of less than 1 kg/cm$^2$ is sufficient. The effects of the press tempering treatment can be obtained by inline performing the press tempering treatment in the continuous quenching line at the time of heating and holding for tempering after the quenching treatment or by offline performing the press tempering treatment at the time of reheating to 200° C. to 450° C. after the quenching treatment. Though the effects of the present invention can be obtained sufficiently if the tempering treatment is performed before the press tempering treatment, it is preferred that the press tempering treatment of the as-quenched steel sheet is performed.

<Tension Annealing Treatment>

By performing the tension annealing treatment of the as-quenched steel sheet at a tempering temperature range, it is possible to recover the toughness by the tempering as well as to recover the quenching strain and the residual stresses, and it is possible to obtain a flatness of the steel sheet of 0.1% or less, in the same manner as when the aforementioned press tempering treatment is performed. Where the heating temperature is below 200° C., good flatness cannot be obtained. Meanwhile, where the heating temperature is above 450° C., the softening occurs as mentioned above and sufficient yield strength cannot be obtained. The tensile tension in tension annealing need not be particularly large, provided that the flat shape of the steel sheet is maintained, and a sufficient effect can be obtained at a tension equal to or higher than 1 N/mm$^2$. However, where a tension in excess of 200 N/mm$^2$ is applied, the sheet can rupture inside a furnace. Therefore, it is preferred that the upper limit be set to 200 N/mm$^2$. The effects of the tension annealing treatment can be obtained by inline performing the tension annealing treatment in the continuous line at the time of heating and holding for tempering or by offline performing the tension annealing treatment at the time of reheating to 200° C. to 450° C. after the quenching treatment. Though the effects of the present invention can be obtained sufficiently if the tempering treatment is performed before the tension annealing treatment, it is preferred that the tension annealing treatment of the as-quenched steel sheet is performed.

<Metallographic Structure>

In a case where a mechanical strength is required, it is preferred that the metallographic structure of the steel sheets obtained by adjusting the compositions mentioned above and tempering after the transformation is composed of a single phase of martensite, a single phase of bainite, or a composite structure including less than 10% by volume of ferrite in addition to martensite. The metallographic structure having a high dislocation density such as the martensite or bainite phase can fix the steel sheet in a state of the flat shape since a structure change accompanying the precipitation of fine carbides and the dislocation recovery by the tempering occurs during the press tempering treatment or tension annealing treatment. Structures other than these structures are hard to provide effects of the shape correction if performing the press tempering or tension annealing treatment.

<Formation of Insulating Coating>

In accordance with the present invention, it is preferred that an insulating coating consisting of an organic material, an insulating coating consisting of an inorganic material, or an insulating coating consisting of an organic-inorganic composite material be formed on at least one surface of the steel sheet with the object of reducing the eddy current loss generated in the rotor. An application of the insulating coating may be conducted in an inline or offline process. An insulating coating consisting of an inorganic material can be obtained using an inorganic aqueous solution which includes aluminum dihydrogen phosphate and is free from hazardous substances such as hexavalent chromium. An insulating coating consisting of an organic material or an insulating coating consisting of an organic-inorganic composite material may also be used, provided that good insulation is obtained. The insulating coating can be formed by coating the material presented hereinabove by way of example on the surface of a steel sheet. When the press tempering treatment is performed in an inline process, it is preferred that the material presented hereinabove by way of example be coated on the surface of a steel sheet before the press tempering treatment.

EXAMPLES

Example 1

Steel having the compositions shown in Tables 1 and 2 was melted and the continuously cast slabs thereof were heated to 1250° C., finish rolled at 850° C., and coiled at 560° C. to obtain hot-rolled steel sheets with a sheet thickness of 1.8 mm. These hot-rolled steel sheets were pickled and cold rolled to obtain cold-rolled steel sheets with a sheet thickness of 0.35 mm.

The cold-rolled steel sheets obtained were heated to 900° C., threaded into a Pb—Bi alloy bath set at 250° C. so as to cool down to 250° C. at an average cooling speed of 100° C./sec, and then without a break, press tempering treatment was performed while keeping the steel sheets in an electric furnace set at 400° C. for 60 seconds. Then, an insulating coating with a thickness of about 1 μm, having a semi-organic composition including Cr oxide and Mg oxide, was formed on both sides of the steel sheets.

TABLE 1

Composition of sample materials

| Steel No. | C | Si | Mn | P | S | sol. Al | Si + sol. Al | Ti, Nb, V | Mo, Cr, B | Cu, Ni |
|---|---|---|---|---|---|---|---|---|---|---|
| 1 | 0.0005 | 0.22 | 0.24 | 0.013 | 0.005 | 0.02 | 0.24 | Ti: 0.039 | B: 0.002 | — |
| 2 | 0.0018 | 0.46 | 1.36 | 0.016 | 0.004 | 0.02 | 0.48 | — | — | — |
| 3 | 0.0043 | 0.003 | 0.31 | 0.011 | 0.006 | 0.03 | 0.03 | Nb: 0.044 | B: 0.001 | — |
| 4 | 0.011 | 0.24 | 0.65 | 0.023 | 0.004 | 0.04 | 0.28 | — | — | — |
| 5 | 0.025 | 0.31 | 0.52 | 0.018 | 0.009 | 0.01 | 0.32 | — | — | — |
| 6 | 0.032 | 0.001 | 1.80 | 0.042 | 0.013 | 0.02 | 0.02 | — | — | — |
| 7 | 0.046 | 0.02 | 1.63 | 0.012 | 0.008 | 0.06 | 0.08 | — | — | — |
| 8 | 0.049 | 0.11 | 1.65 | 0.017 | 0.003 | 0.04 | 0.15 | — | — | — |
| 9 | 0.057 | 0.002 | 2.44 | 0.035 | 0.008 | 0.03 | 0.03 | — | — | — |
| 10 | 0.071 | 0.66 | 1.65 | 0.022 | 0.009 | 0.02 | 0.68 | — | — | — |
| 11 | 0.221 | 0.20 | 0.92 | 0.016 | 0.003 | 0.03 | 0.23 | Ti: 0.015 | B: 0.003 | — |
| 12 | 0.210 | 0.15 | 0.87 | 0.019 | 0.005 | 0.02 | 0.17 | Ti: 0.019 | — | Cu: 0.15 |
| 13 | 0.216 | 0.18 | 0.88 | 0.022 | 0.004 | 0.04 | 0.22 | Ti: 0.015 | — | Cu: 1.18 |
| 14 | 0.208 | 0.23 | 0.94 | 0.017 | 0.005 | 0.03 | 0.26 | Ti: 0.005 | Cr: 0.13 | Cu: 0.33 |
| 15 | 0.431 | 0.23 | 0.56 | 0.013 | 0.011 | 0.006 | 0.24 | — | — | — |
| 16 | 0.822 | 0.23 | 0.46 | 0.013 | 0.010 | 0.005 | 0.24 | — | — | — |
| 17 | 1.202 | 0.82 | 0.48 | 0.012 | 0.009 | 0.05 | 0.87 | — | — | — |
| 18 | 0.160 | 1.24 | 0.05 | 0.022 | 0.010 | 0.04 | 1.28 | — | Mo: 0.20 | — |
| 19 | 0.182 | 0.38 | 0.63 | 0.013 | 0.006 | 0.49 | 0.87 | Ti: 0.102 | B: 0.002 | — |
| 20 | 0.223 | 1.81 | 0.43 | 0.015 | 0.012 | 0.04 | 1.85 | — | B: 0.002 | — |

TABLE 2

Composition of sample materials

| Steel No. | C | Si | Mn | P | S | sol. Al | Si + sol. Al | Ti, Nb, V | Mo, Cr, B | Cu, Ni |
|---|---|---|---|---|---|---|---|---|---|---|
| 21 | 0.186 | 0.61 | 0.52 | 0.015 | 0.011 | 1.52 | 2.13 | — | — | — |
| 22 | 0.350 | 2.46 | 0.22 | 0.012 | 0.011 | 0.03 | 2.49 | — | — | — |
| 23 | 0.169 | 0.59 | 0.67 | 0.020 | 0.009 | 2.08 | 2.67 | — | — | — |
| 24 | 0.189 | 3.21 | 0.54 | 0.015 | 0.008 | 0.03 | 3.24 | — | — | — |
| 25 | 0.160 | 0.05 | 0.81 | 0.016 | 0.008 | 3.53 | 3.58 | — | — | — |
| 26 | 0.169 | 2.45 | 0.73 | 0.015 | 0.009 | 0.98 | 3.43 | — | — | — |

TABLE 2-continued

Composition of sample materials

| Steel No. | C | Si | Mn | P | S | sol. Al | Si + sol. Al | Ti, Nb, V | Mo, Cr, B | Cu, Ni |
|---|---|---|---|---|---|---|---|---|---|---|
| 27 | 0.183 | 0.73 | 2.77 | 0.014 | 0.009 | 0.05 | 0.78 | — | — | |
| 29 | 0.064 | 0.30 | 2.07 | 0.017 | 0.004 | 0.024 | 0.32 | Ti: 0.038<br>Nb: 0.022 | — | Cu: 0.05 |
| 30 | 0.058 | 0.27 | 2.10 | 0.020 | 0.005 | 0.031 | 0.30 | Ti: 0.061<br>Nb: 0.018 | — | Cu: 0.02<br>Ni: 0.04 |
| 31 | 0.123 | 0.98 | 0.87 | 0.012 | 0.009 | 0.22 | 1.20 | Ti: 0.150 | — | — |
| 32 | 0.132 | 1.02 | 0.92 | 0.014 | 0.010 | 0.023 | 1.04 | Nb: 0.01 | Mo: 0.13 | — |
| 33 | 0.145 | 1.24 | 0.76 | 0.012 | 0.011 | 0.013 | 1.25 | V: 0.03 | Mo: 0.45 | — |
| 34 | 0.126 | 0.99 | 1.27 | 0.011 | 0.008 | 0.03 | 1.02 | Ti: 0.08<br>Nb: 0.02 | Cr: 0.83<br>B: 0.003 | — |
| 35 | 0.143 | 1.02 | 1.25 | 0.009 | 0.009 | 0.05 | 1.07 | Nb: 0.05<br>V: 0.03 | — | — |
| 36 | 0.128 | 1.05 | 1.24 | 0.008 | 0.011 | 0.05 | 1.10 | Ti: 0.02<br>Nb: 0.03<br>V: 0.02 | — | — |

Ring-shaped test pieces with an inner diameter of 33 mm and an outer diameter of 45 mm were fabricated by punching from the obtained steel strips and used for DC magnetization measurements under the condition of magnetization to 8000 A/m. The steepness per unit width of the obtained steel strips was measured, and JIS No. 5 test pieces were cut out from the obtained steel strips and provided for a tensile test. In the bending test, bendability was evaluated by assigning good bendability (○) to test pieces in which no cracking occurred and assigning poor bendability (x) to test pieces in which cracking occurred. The sheet-thickness cross section in the rolling direction of each steel sheet was etched with a 2% nital reagent (2% nitric acid-ethyl alcohol solution), and observations using a scanning electron microscope were used to classify the metallographic structure into martensite, bainite, ferrite or pearlite, and on the basis of the morphology thereof. The area ratio of martensite was obtained by image analyzing 10 fields magnified 1000 times.

The magnetic flux density $B_{8000}$ at a magnetic field strength of 8000 A/m, residual magnetic flux density Br and coercivity Hc at this time, flatness, yield strength, tensile strength, yield ratio (YR), bendability and metallographic structure before the cold rolling of each sample are shown in Tables 3 and 4.

TABLE 3

Properties of steel sheets

| Steel No. | Presence/absence of press tempering | $B_{8000}$ (T) | Br (T) | Coercivity Hc (A/m) | Flatness (%) | Yield strength (N·mm$^{-2}$) | Tensile strength (N·mm$^{-2}$) | YR (%) | Bendability (○, x) | Metallographic structure* | Notes |
|---|---|---|---|---|---|---|---|---|---|---|---|
| 1 | Presence | 1.8 | 1.2 | 254 | 0.03 | 249 | 346 | 72 | ○ | B | Example of the present |
| 2 | Presence | 1.8 | 1.2 | 469 | 0.02 | 314 | 393 | 80 | ○ | B | Example of the present |
| 3 | Presence | 1.8 | 1.2 | 373 | 0.03 | 278 | 351 | 79 | ○ | B | Example of the present |
| 4 | Presence | 1.8 | 1.2 | 731 | 0.04 | 364 | 460 | 79 | ○ | B | Example of the present |
| 5 | Presence | 1.8 | 1.3 | 805 | 0.03 | 381 | 475 | 80 | ○ | B | Example of the present |
| 6 | Presence | 1.8 | 1.3 | 936 | 0.03 | 523 | 656 | 79 | ○ | B | Example of the present |
| 7 | Presence | 1.8 | 1.3 | 1007 | 0.02 | 638 | 735 | 87 | ○ | B | Example of the present |
| 8 | Presence | 1.8 | 1.3 | 1024 | 0.03 | 779 | 934 | 83 | ○ | B | Example of the present |
|  | Absence | 1.8 | 1.3 | 1035 | 0.21 | 791 | 936 | 85 | ○ | B | Example of the present |
| 9 | Presence | 1.8 | 1.3 | 1012 | 0.03 | 767 | 919 | 83 | ○ | B | Example of the present |
| 10 | Presence | 1.7 | 1.2 | 1098 | 0.04 | 853 | 1012 | 84 | ○ | B | Example of the present |
| 11 | Presence | 1.7 | 1.2 | 1133 | 0.03 | 893 | 1092 | 82 | ○ | M | Example of the present |
| 12 | Presence | 1.7 | 1.3 | 1190 | 0.04 | 961 | 1145 | 84 | ○ | M | Example of the present |
| 13 | Presence | 1.7 | 1.3 | 1185 | 0.04 | 938 | 1129 | 83 | ○ | M | Example of the present |
| 14 | Presence | 1.7 | 1.3 | 1239 | 0.05 | 952 | 1138 | 84 | ○ | M | Example of the present |
| 15 | Presence | 1.7 | 1.2 | 1631 | 0.03 | 1106 | 1242 | 89 | ○ | M | Example of the present |
| 16 | Presence | 1.7 | 1.2 | 1893 | 0.02 | 1315 | 1467 | 90 | ○ | M | Example of the present |
| 17 | Presence | <u>1.6</u> | 1.1 | 2675 | 0.03 | 1703 | 1941 | 88 | ○ | M | Comparative example |
| 18 | Presence | 1.7 | 1.2 | 1187 | 0.03 | 1011 | 1063 | 95 | ○ | M | Example of the present |
| 19 | Presence | 1.7 | 1.3 | 1256 | 0.03 | 1127 | 1199 | 94 | ○ | M | Example of the present |
| 20 | Presence | 1.7 | 1.2 | 1228 | 0.04 | 1087 | 1148 | 95 | ○ | M | Example of the present |

Underline does not satisfy conditions specified by the present invention.
*In the column "Metallographic structure", B: bainite and M: martensite.

TABLE 4

Properties of steel sheets

| Steel No. | Presence/absence of press tempering | $B_{8000}$ (T) | Br (T) | Coercivity Hc (A/m) | Flatness (%) | Yield strength (N·mm$^{-2}$) | Tensile strength (N·mm$^{-2}$) | YR (%) | Bendability (o, x) | Metallographic structure* | Notes |
|---|---|---|---|---|---|---|---|---|---|---|---|
| 21 | Presence | 1.72 | 1.27 | 1207 | 0.03 | 1023 | 1152 | 89 | o | M | Example of the present invention |
| 22 | Presence | 1.69 | 1.18 | 1381 | 0.03 | 1138 | 1261 | 90 | o | M | Example of the present invention |
| 23 | Presence | 1.71 | 1.19 | 1250 | 0.02 | 1015 | 1133 | 90 | o | M | Example of the present invention |
| 24 | Presence | <u>1.63</u> | 1.12 | 1205 | 0.04 | 1026 | 1113 | 92 | x | M | Comparative example |
| 25 | Presence | <u>1.62</u> | 1.10 | 1193 | 0.03 | 1029 | 1130 | 91 | o | M | Comparative example |
| 26 | Presence | <u>1.63</u> | 1.17 | 1189 | 0.03 | 1091 | 1162 | 94 | o | M | Comparative example |
| 27 | Presence | <u>1.64</u> | 1.18 | 1262 | 0.04 | 1021 | 1155 | 88 | o | M | Comparative example |
| 29 | Presence | 1.73 | 1.19 | 1016 | 0.05 | 829 | 921 | 90 | o | B | Example of the present invention |
| 30 | Presence | 1.72 | 1.22 | 1009 | 0.03 | 831 | 915 | 91 | o | B | Example of the present invention |
|  | Absence | 1.72 | 1.23 | 998 | 0.26 | 826 | 921 | 90 | o | B | Example of the present invention |
| 31 | Presence | 1.73 | 1.23 | 1180 | 0.03 | 1021 | 1086 | 94 | o | B | Example of the present invention |
| 32 | Presence | 1.72 | 1.26 | 1137 | 0.02 | 1020 | 1059 | 96 | o | B | Example of the present invention |
| 33 | Presence | 1.70 | 1.21 | 1205 | 0.03 | 1093 | 1161 | 94 | o | B | Example of the present invention |
| 34 | Presence | 1.74 | 1.30 | 1151 | 0.04 | 1018 | 1083 | 94 | o | B | Example of the present invention |
| 35 | Presence | 1.73 | 1.26 | 1213 | 0.04 | 1087 | 1137 | 96 | o | B | Example of the present invention |
| 36 | Presence | 1.73 | 1.27 | 1258 | 0.03 | 1075 | 1206 | 89 | o | B | Example of the present invention |

Underline does not satisfy conditions specified by the present invention.
*In the column "Metallographic structure", B: bainite and M: martensite.

As can be clearly seen from the results shown in Tables 3 and 4, since the magnetic flux density ($B_{8000}$) of steel No. 17 with a high C content and steel Nos. 24 to 27 which have a high content of Si, Al, and Mn, were less than 1.65 T, a steel sheet having the magnetic flux density and coercivity stipulated by the present invention cannot be obtained. The parts in which press tempering was not performed in Steel Nos. 8 and 30 had inferior flatness.

Among the steel strips obtained, steel Nos. 1, 2, 16 and 17 were punched into rotors with an 8-pole (4 pole pairs) structure shown in FIG. 1, and provided for a motor performance evaluation test in which a load torque was applied. For comparison, a rotor using a commercial electromagnetic steel sheet (35A300) was also fabricated at the same time for comparison and provided for the same test. Only one stator was fabricated and used for performance evaluation of the motor in combinations with the fabricated rotors. In the performance evaluation, the field-weakening control was performed at a rotational speed equal to or higher than 10,000 rpm.

Mechanical properties and magnetic properties were evaluated for the commercial electromagnetic steel sheet (35A300, sheet thickness: 0.35 mm) by the same method as used for the base steel sheets in accordance with the present invention. The yield strength was 381 N/mm², the tensile strength was 511 N/mm², the saturation magnetic flux density $B_{8000}$ was 1.76 T, the residual magnetic flux density Br was 0.42 T, and the coercivity Hc was 61 A/m.

Specifications of the fabricated rotor and stator are described below.

<Rotor Specifications>
Outer diameter: 80.1 mm, axial length: 50 mm
Number of laminated sheets: 0.35 mm/140 sheets
Width of center bridge and outer bridge: 1.00 mm
Permanent magnet: neodymium magnet (NEOMAX-38VH), 9.0 mm in width×3.0 mm in thickness×50 mm in length, a total of 16 magnets are embedded <Stator Specifications>
Gap length: 0.5 mm
Outer diameter: 138.0 mm, yoke thickness: 10 mm, length: 50 mm
Core material: electromagnetic steel sheet (35A300), sheet thickness 0.35 mm
Number of laminated sheets: 140 sheets
Winding method: distributed winding The maximum torque and efficiency of IPM motors incorporating respective rotors at 5000 rpm and a current advance angle (β) of 0°, and also the maximum torque and efficiency at 15,000 rpm obtained by implementing the field-weakening control such as to obtain the maximum torque are shown in Table 5 for the input conditions of a carrier frequency of 1000 Hz, a maximum voltage of 220 V, and a maximum current of 24 A.

TABLE 5

Evaluation results

| | | | | Motor performance at 5000 rpm and β: 0° | | Motor performance at 15,000 rpm and field-weakening control | | |
|---|---|---|---|---|---|---|---|---|
| Steel No. | $B_{8000}$ (T) | Br (T) | Hc (A/m) | Max. torque (N·m) | Efficiency (%) | Max. torque (N·m) | Efficiency (%) | Notes |
| Electromagnetic steel sheet 35A300 | 1.76 | <u>0.42</u> | 61 | 4.0 | 83 | 1.5 | 82 | Comparative example |
| 1 | 1.89 | 1.21 | 254 | 4.2 | 86 | 2.5 | 86 | Example of the present invention |

TABLE 5-continued

| | | | | Evaluation results | | | | |
|---|---|---|---|---|---|---|---|---|
| | | | | Motor performance at 5000 rpm and β: 0° | | Motor performance at 15,000 rpm and field-weakening control | | |
| Steel No. | $B_{8000}$ (T) | Br (T) | Hc (A/m) | Max. torque (N·m) | Efficiency (%) | Max. torque (N·m) | Efficiency (%) | Notes |
| 2 | 1.86 | 1.25 | 469 | 4.3 | 87 | 2.6 | 88 | Example of the present invention |
| 16 | 1.76 | 1.29 | 1893 | 5.0 | 89 | 3.1 | 92 | Example of the present invention |
| 17 | <u>1.61</u> | 1.14 | 2675 | 4.9 | 88 | 1.7 | 84 | Comparative example |

Underline does not satisfy conditions specified by the present invention.

As can be clearly seen from the results shown in Table 5, in a motor incorporating a rotor using as a material for the rotor core a steel sheet (electromagnetic steel sheet) with a residual magnetic flux density Br less than 0.5 and a coercivity Hc less than 100 A/m, the maximum torque at 5000 rpm and β=0° was low and the efficiency degraded. In addition, such motor also had a low maximum torque of less than 2.0 N·m at 15,000 rpm and also a low efficiency when the field-weakening control was implemented. By contrast, in the motor using for the rotor core a steel sheet having the magnetic flux density ($B_{8000}$ and Br) and coercivity Hc stipulated by the present invention, a high maximum torque was obtained at 5000 rpm and β=0° and the efficiency was also high. Furthermore, this motor had a high maximum torque equal to or higher than 2.0 N·m at 15,000 rpm and also a high efficiency when the field-weakening control was implemented.

On the other hand, a motor using steel No. 17 having a high coercivity but a low magnetic flux density $B_{8000}$ had a low maximum torque and a low efficiency at 15,000 rpm when the field-weakening control was implemented because of a the low magnetic flux density.

Because the deflection resulting from the shift of the d-axis magnetic flux caused by the dq-axes interference was small, the current advance angle β at which maximum torque was obtained at 15,000 rpm in the material of the present invention had a value lower than that of the comparative material.

Example 2

Continuously cast slabs of steel Nos. 1, 2, 3, 4, 8, 9 and 11, among the steel having the compositions shown in Table 1, were heated to 1250° C., finish rolled at 950° C., and coiled at 560° C. to obtain hot-rolled steel sheets with a sheet thickness of 1.8 mm in the same manner as in Example 1. These hot-rolled steel sheets were pickled and cold rolled once to obtain cold-rolled steel strips with a thickness of 0.35 mm (final reduction: about 81%).

The obtained cold-rolled steel strips were subjected to recrystallization annealing by allowing the strips to pass for 60 seconds in a continuous furnace which was set to 800° C. After cooling down to 550° C. at a rate of 8° C./s, overaging treatment was performed in which the sheets were held for 120 seconds or longer in a continuous furnace set to 450° C. Soft cold rolling with an elongation of 0.3% was then performed and an insulating coating with a thickness of about 1 μm that included a Cr-containing oxide and a Mg-containing oxide and had a semi-organic composition was formed on both sides of the steel sheets.

The magnetic flux density $B_{8000}$ at a magnetic field strength of 8000 A/m, residual magnetic flux density Br and coercivity Hc at this time, flatness, yield strength, tensile strength, yield ratio (YR), bendability and metallographic structure of each sample were evaluated in the same manner as in Example 1. The results are shown in Table 6.

TABLE 6

| | | | | | | | | | | |
|---|---|---|---|---|---|---|---|---|---|---|
| | | | | Properties of steel sheets | | | | | | |
| Steel No. | $B_{8000}$ (T) | Br (T) | Coercivity Hc (A/m) | Flatness (%) | Yield strength (N·mm$^{-2}$) | Tensile strength (N·mm$^{-2}$) | YR (%) | Bendability (o, x) | Metallographic structure* | Notes |
| 1 | 1.89 | <u>0.45</u> | 58 | 0.09 | 203 | 267 | 76 | o | α + T | Comparative example |
| 2 | 1.87 | <u>0.48</u> | 97 | 0.08 | 288 | 369 | 78 | o | α | Comparative example |
| 3 | 1.88 | 0.63 | 89 | 0.07 | 247 | 315 | 78 | o | α + T | Example of the present invention |
| 4 | 1.87 | <u>0.46</u> | 83 | 0.09 | 290 | 358 | 81 | o | α + T | Comparative example |
| 8 | 1.83 | <u>0.49</u> | 96 | 0.07 | 375 | 446 | 84 | o | α + P | Comparative example |
| 9 | 1.81 | 0.57 | 124 | 0.06 | 456 | 532 | 86 | o | α + P | Example of the present invention |
| 11 | 1.77 | 0.96 | 347 | 0.08 | 393 | 477 | 88 | o | α + P + T | Example of the present invention |

Underline does not satisfy conditions specified by the present invention.
*In the column "Metallographic structure", α: ferrite, P: pearlite, and T is a carbonitride including one or more from Fe, Ti, Nb, V, Mo, and Cr.

As can be clearly seen from the results shown in Table 6, even when no strains are imparted by cold rolling and heat treatment, where the number of fine precipitates is large, as in steel No. 3, a residual magnetic flux density Br of 0.5 T or more was obtained. Further, where the C content is equal to or higher than 0.05% by mass, a good value of coercivity Hc which is equal to or higher than 100 A/m was obtained. Even when the C content was low, a steel sheet having the magnetic flux density ($B_{8000}$ and Br) and coercivity Hc stipulated by the present invention can be obtained by imparting strains such as in Example 1, but the desirable range of C content is equal to or higher than 0.05% by mass.

Rotors were fabricated in the same manner as in Example 1 by using steel Nos. 1, 2, 3, 9 and 11 among the obtained steel strips, and the rotors were provided for a motor performance evaluation test.

The maximum torque and efficiency of IPM motors incorporating respective rotors at 15000 rpm are shown in Table 7 for the input conditions of a carrier frequency of 1000 Hz, a maximum voltage of 220 V, and a maximum current of 24 A. All of the properties were evaluated under the optimum field-weakening control conditions at which the maximum torque was obtained.

TABLE 7

Evaluation results

| Steel No. | $B_{8000}$ (T) | Br (T) | Hc (A/m) | Motor performance at 15,000 rpm and weak field control | | Notes |
|---|---|---|---|---|---|---|
| | | | | Torque (N·m) | Efficiency (%) | |
| 1 | 1.89 | <u>0.45</u> | 58 | 1.7 | 82 | Comparative example |
| 2 | 1.87 | <u>0.48</u> | 97 | 1.8 | 83 | Comparative example |
| 3 | 1.88 | 0.63 | 89 | 2.1 | 85 | Example of the present invention |
| 9 | 1.81 | 0.57 | 124 | 2.1 | 85 | Example of the present invention |
| 11 | 1.77 | 0.96 | 347 | 2.3 | 86 | Example of the present invention |

Underline does not satisfy conditions specified by the present invention.

As can be clearly seen from the results shown in Table 7, in a motor incorporating a rotor using as a material for the rotor core a steel sheet (steel Nos. 1 and 2) with a residual magnetic flux density Br less than 0.5, a maximum torque at 15,000 rpm had a low value of less than 2.0 N·m and also a low efficiency. By contrast, in the motor using for the rotor core a steel sheet having the magnetic flux density ($B_{8000}$ and Br) and coercivity Hc stipulated by the present invention, a high maximum torque equal to or higher than 2.0 N·m and also good efficiency are obtained.

Figure 2:
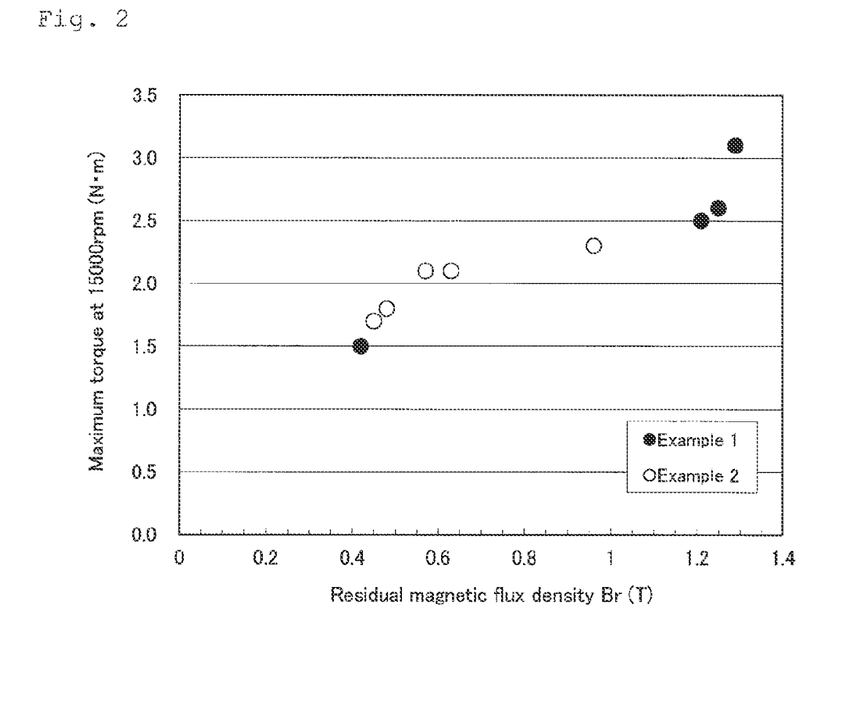
FIG. 2 is a graph depicting a relationship between the maximum torque at 15000 rpm and the residual magnetic flux density of a rotor material in the test motors evaluated in Example 1 and Example 2.

In FIG. 2, the relationships between the maximum torque at 15000 rpm and the residual magnetic flux density Br of the rotor materials in the test motors evaluated in Example 1 and Example 2 are shown by graphs. This figure also indicates that where the residual magnetic flux density Br of the rotor material is 0.5 T or more, a high maximum torque of 2.0 N·m or more can be obtained in a high-speed rotational range of 15,000 rpm.

Figure 3:
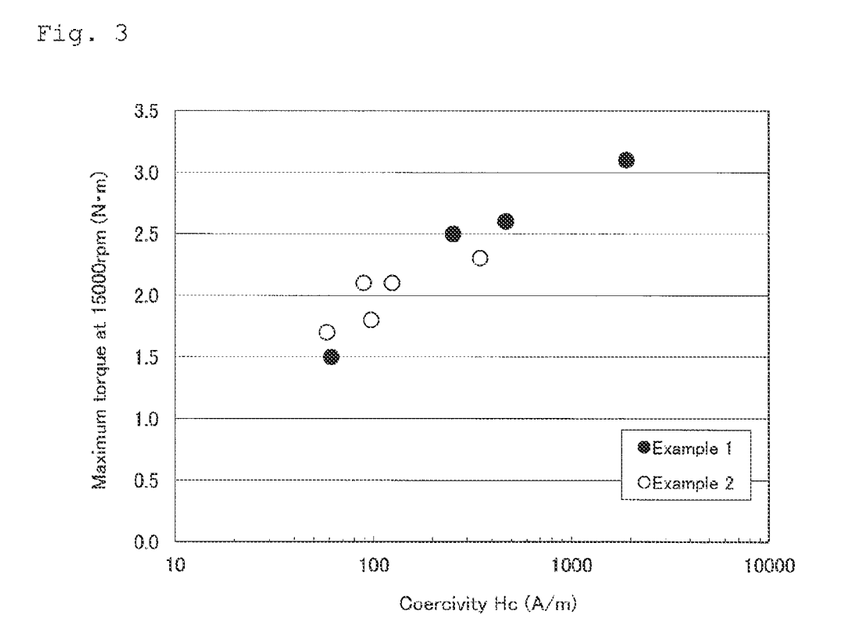
FIG. 3 is a graph depicting a relationship between the maximum torque at 15000 rpm and the coercivity of a rotor material in the test motors evaluated in Example 1 and Example 2.

FIG. 3 is a graph depicting a relationship between the maximum torque at 15000 rpm and the coercivity Hc of a rotor material in a test motor evaluated in Example 1 and Example 2. This figure indicates that where the residual magnetic flux density Br is equal to or higher than 0.5 T, a high torque can be obtained even when the coercivity Hc is less than 100 A/m, but using a rotor material with a high coercivity Hc is effective for stably obtaining a higher torque in a high-speed rotational range of 15,000 rpm.

The invention claimed is:

1. A method for manufacturing a steel sheet for a rotor core for an IPM motor, which has a magnetic flux density $B_{8000}$ of 1.65 T or more as measured when magnetic field strength is 8000 A/m and a residual magnetic flux density Br of 0.5 T or more as measured at that time, wherein a hot-rolled steel sheet having a composition comprising: C: more than 0.0005% by mass to 0.90% by mass, Si: 0% by mass to 3.0% by mass, Mn: 0% by mass to 0.05% by mass, P: 0.05% by mass or less, S: 0.02% by mass or less, acid-soluble Al: 0.005% by mass to 3.0% by mass, and Si+Al: 5.0% by mass or less, with a balance of Fe and inevitable impurities, is cold rolled, heated to 800° C. or more in a continuous annealing line or continuous quenching line, then cooled down to 450° C. or less at a cooling speed of 10° C./sec or more and held at a temperature range of 200° C. to 450° C. for at least 20 seconds and less than 120 seconds, and then a step of adjusting a flatness defined by a steepness per sheet width to 0.1% or less by performing inline or offline press tempering treatment in a state of being held at said temperature range of 200° C. to 450° C.

2. The method for manufacturing a steel sheet for a rotor core for an IPM motor according to claim 1, wherein the steel sheet for a rotor core for an IPM motor has a coercivity Hc of 100 A/m or more as measured after magnetization reaches 8000 A/m.

3. The method for manufacturing a steel sheet for a rotor core for an IPM motor according to claim 1, wherein the metallographic structure of the steel sheet for a rotor core for an IPM motor is composed of a single phase of martensite, a single phase of bainite, or a composite structure including less than 10% by volume of ferrite in addition to martensite.

4. The method for manufacturing a steel sheet for a rotor core for an IPM motor according to claim 1, wherein the hot-rolled steel sheet further comprises one or more components selected from the group consisting of Ti, Nb, and V at 0.01% by mass to 0.20% by mass in total.

5. The method for manufacturing a steel sheet for a rotor core for an IPM motor according to claim 1, wherein the hot-rolled steel sheet further comprises one or more components selected from the group consisting of Mo: 0.1% by mass to 0.6% by mass, Cr: 0.1% by mass to 1.0% by mass and B: 0.0005% by mass to 0.005% by mass.

6. The method for manufacturing a steel sheet for a rotor core for an IPM motor according to claim 1, wherein the hot-rolled steel sheet further comprises one or more components selected from the group consisting of Cu: 0.05% by mass to 1.5% by mass and Ni: 0.05% by mass to 1.0% by mass.

7. The method for manufacturing a steel sheet for a rotor core for an IPM motor according to claim 1, wherein the content of C in the hot-rolled steel sheet is more than 0.0005% by mass to 0.058% by mass.

8. The method for manufacturing a steel sheet for a rotor core for an IPM motor according to claim 1, further comprising a step of forming an insulating coating consisting of an organic material, an insulating coating consisting of an inorganic material or an insulating coating consisting of an organic-inorganic composite material on at least one surface of the steel sheet in an inline or offline process.

9. The method for manufacturing a steel sheet for a rotor core for an IPM motor according to claim 1, wherein a pressure in the inline or offline press tempering treatment is less than 1 kg/cm$^2$.

* * * * *